United States Patent [19]

Stewart

[11] 4,350,515

[45] Sep. 21, 1982

[54] METHOD OF PRODUCING GLASS EDGE MULTIPLE GLAZED UNITS

[75] Inventor: John L. Stewart, Murrysville, Pa.

[73] Assignee: PPG Industries, Inc., Pittsburgh, Pa.

[21] Appl. No.: 229,710

[22] Filed: Jan. 30, 1981

[51] Int. Cl.³ .................... C03B 23/203; C03B 23/24
[52] U.S. Cl. ............................................ 65/40; 65/36; 65/43; 65/54; 65/DIG. 4
[58] Field of Search .......... 65/36, 40, 58, 43, DIG. 4, 65/54

[56] References Cited

U.S. PATENT DOCUMENTS

| | | | |
|---|---|---|---|
| 2,389,360 | 11/1945 | Guyer et al. | 65/40 |
| 2,394,051 | 2/1946 | Guyer et al. | 65/DIG. 4 |
| 2,624,978 | 1/1953 | Hohmann | 65/40 X |
| 2,624,979 | 1/1953 | Clever et al. | 65/40 X |
| 2,977,722 | 4/1961 | Mazzoni | 65/58 X |
| 3,510,285 | 5/1970 | Murray et al. | 65/40 |
| 3,628,935 | 12/1971 | Jansson et al. | 65/40 |
| 3,726,658 | 4/1973 | Banks | 65/40 |
| 3,824,088 | 7/1974 | Bryan et al. | 65/40 |
| 3,847,584 | 11/1974 | Houser et al. | 65/40 |
| 4,132,539 | 1/1979 | Jeffries | 65/40 |

FOREIGN PATENT DOCUMENTS 1277404  6/1972  United Kingdom .................... 65/36

Primary Examiner—Richard V. Fisher
Attorney, Agent, or Firm—Donald Carl Lepiane; Lee Patch

[57] ABSTRACT

A glass edge multiple glazed unit having fillets of substantially uniform thickness is produced by the application of heat to marginal edge portions of adjacent sheets, followed by a delay sufficient to establish a substantially uniform, greater than fusing temperature condition in the body of fillet-forming glass. The fused sheets are thereafter drawn apart a preselected distance to a spaced-apart face-to-face relation to form a glass-edge multiple glazed unit.

10 Claims, 3 Drawing Figures

METHOD OF PRODUCING GLASS EDGE MULTIPLE GLAZED UNITS

FIELD OF THE INVENTION

This invention relates to glass edge multiple glazed units, and more particularly to a method of producing such a multiple glazed unit having peripheral wall members of substantially uniform thickness.

DISCUSSION OF THE TECHNICAL PROBLEM

In the manufacture of multiple glazed window units it is generally known to unite the margins of an assembly of glass sheets with a peripheral weld and pull the sheets apart to a desired spacing while the peripheral weld is in a softened state. Customarily, two glass sheets are washed, dried, preheated and assembled at a welding station one above the other. An electrically conductive stripe is deposited upon the marginal edge portions of at least one of the sheets, preferably on the upper surface of the upper sheet, and electrical heating current is passed therethrough in a convenient manner to heat the marginal edge portions. At a predetermined temperature the heated marginal edge portions of the glass become sufficiently electrically conductive for the heating current to pass directly through the glass, afterwhich the conductive stripe burns off. Current passes directly through the glass to continue to directly heat the marginal edges of the upper sheet and indirectly heat the adjacent marginal edges of the lower sheet. Heating is generally continued until the marginal edges of the upper sheet soften and sag into contact with the softened marginal edges of the lower sheet to form a continuous peripheral weld uniting the assembled sheets. U.S. Pat. Nos. 3,847,584 to Houser et al and 4,132,539 to Jeffries generally teach methods of and apparatus for welding edges of glass sheets by a cyclic electrical heating technique whereby longitudinal temperature gradients along marginal edge portions are minimized by the sequential and/or alternate application of voltages along selected marginal edge portions of the sheets.

U.S. Pat. No. 2,624,979 to Clever et al teaches a method of producing welded multiple glazed units in which a cyclic heating technique is generally practiced and further including alternate procedures for separating the adjacent sheets after the peripheral weld is formed to produce units having fillets between the sheets with rounded internal surfaces. In a first separation procedure taught by Clever, eight electrical heating cycles are completed to form a peripheral weld, afterwhich the upper sheet is drawn away from the lower sheet, quickly pushed back toward the lower sheet, and redrawn to a final separation position where it is subjected to a ninth heating cycle.

In the second separation procedure taught by Clever, eight electrical heating cycles are applied to the unit, afterwhich the upper sheet is withdrawn to its final separation position, a ninth cycle of heating is applied, and a pressurized blast of air is directed between the sheets to round out the internal surfaces of the fillets.

While the procedures disclosed in the subject patent may be successful in providing a rounded internal surface on the fillets of a multiple glazed unit, they do not assure that fillets will have substantially uniform thickness along a line transverse to the marginal edges, i.e. when viewed in cross section along a line normal to the plane of the sheets. It has been learned that transverse non-uniformity in the thickness of fillet walls is an undesirable condition, the integrity of the multiple glazed unit being limited by the strength of the thinnest portions of the fillet walls. Such a condition may be particularly troublesome in glass-edge multiple glazed units having relatively large spacing between sheets, e.g., greater than 3/16 inch, because the fused glass at the weld area must be drawn a greater distance to form the fillets.

It is believed that transverse non-uniformity in the thickness of fillets is caused by non-uniformity in the temperature and viscosity of the quantity of fused glass which, when the sheets are drawn apart, form the fillets. A transverse temperature and viscosity gradient within the fillet-forming body of fused glass results in relatively great stretching in high viscosity portions and relatively small stretching in low viscosity portions when the sheets are drawn apart, thus resulting in thin portions and thicker portions in the fillets.

Transverse temperature gradients tend to occur in the fillet-forming body of fused glass because the electrical heating technique previously described tends to pass current through a narrow current path within the elevated temperature, electroconductive glass. Narrow current paths occur because glass resistivity decreases with increased temperature, and because electric currents exhibit the general characteristic of taking the path of least resistance. As current passes along a path through the glass, that path is heated more than surrounding regions, which in turn decreases the resistivity along that path, making it the preferred current path during subsequent heating cycles. The fillet-forming body of fused glass therefore includes a narrow, higher viscosity region surrounded by lower viscosity regions, which when drawn, results in non-uniform fillet thickness. It would be desirable to have a method of fusing sheets to form a multiple glazed unit which diminishes or eliminates the problem of non-uniform fillet thickness.

SUMMARY OF THE INVENTION

The present invention provides a method of producing glass-edge multiple glazed units having fillets of substantially uniform thickness, including the steps of positioning sheets in adjacent face-to-face relation; heating the marginal edge portions of at least one of the sheets to form a weld which unites the sheets; and drawing the sheets apart a preselected distance after the expiration of a preselected delay period. The delay before practicing the drawing step, meaning that the time period is increased between the end of the heating step and the start of the drawing step, permits heat flow from the narrow, higher temperature region to adjacent cooler regions throughout the fillet-forming body of fused glass, thus diminishing or eliminating undesirable transverse temperature gradients, and thereby, non-uniformity of fillet thickness.

The present invention also relates to a multiple glazed unit having a pair of sheets in face-to-face spaced apart relation and fillets formed of sheet material between adjacent marginal edge portions of the sheets, wherein the sheets are spaced apart greater than ¼ inch (0.63 cm.) and the fillets have substantially uniform cross-sectional thickness between the sheets.

DESCRIPTION OF THE INVENTION

Figure 1:
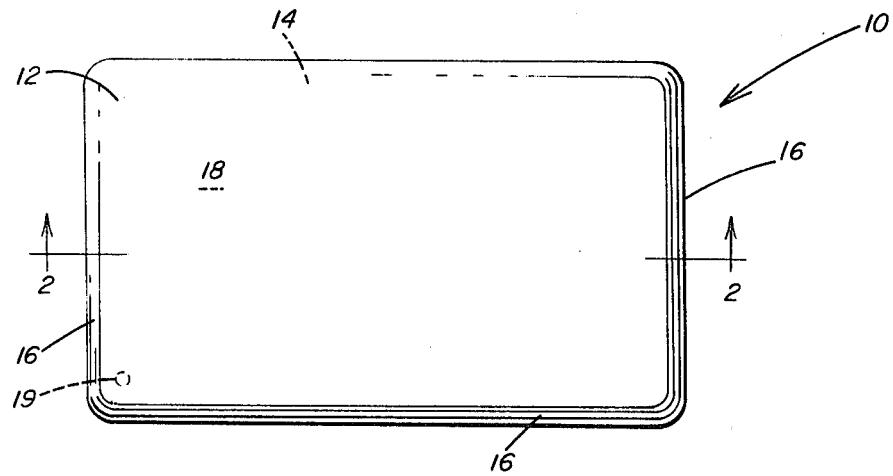
FIG. 1 is a plan view of a glass-edge multiple glazed unit produced according to the present invention.
Figure 2:
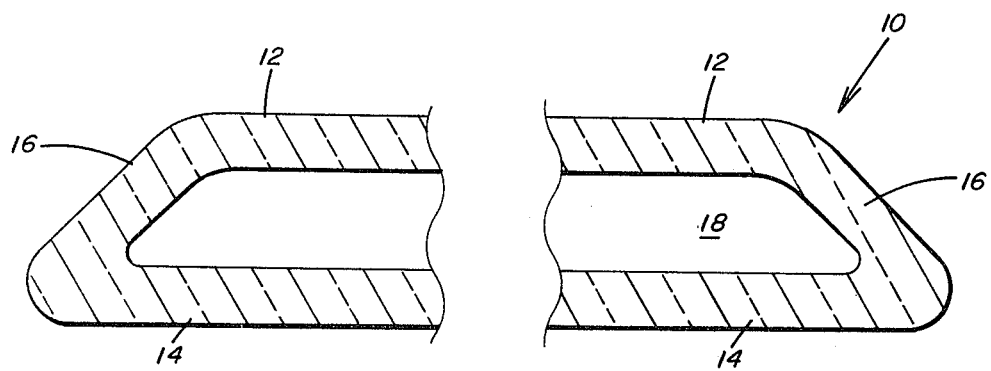
FIG. 2 is a sectional view of a glass edge multiple glazed unit taken along line 2—2 of FIG. 1.

Referring to FIGS. 1 and 2, there is shown a glass edge multiple glazed unit 10, formed of a pair of spaced sheets 12 and 14, to be referred to herein as upper sheet 12 and lower sheet 14 for convenience. As shown in FIG. 2, the upper sheet 12 and lower sheet 14 are joined at the periphery of the unit 10 by a perimeter wall, hereinafter referred to as a fillet 16, to form an air space 18 therebetween.

The multiple glazed unit 10 is, in general, produced by uniting the margins of sheets 12 and 14 with a continuous peripheral weld and thereafter drawing the sheets 12 and 14 apart to a desired spacing while the welded periphery remains soft. More particularly, the sheets 12 and 14 are washed, dried, preheated to a temperature below that at which the glass becomes appreciably electroconductive, and assembled at a welding station one above the other. Preferably, the upper sheet 12 is of slightly greater surface area than the lower sheet 14, extending beyond the periphery thereof about $\frac{1}{8}$ inch (0.32 cm) on all sides when assembled at the welding station. The sheets 12 and 14 are preheated to at least about 800° F. (427° C.) before assembly to minimize temperature differences between the central portions and marginal edge portions thereof which necessarily result during subsequent peripheral welding, thereby minimizing sheet distortion and breakage.

An electrically conductive volatilizable stripe, e.g., material available from the Colloidal Graphite Co., is deposited on the marginal edge of one of the sheets, preferably the upper surface of upper sheet 12, and the sheets are moved to a welding station where a plurality of electrodes are provided adjacent thereto to direct a flow of electrical heating currents along the marginal edge portions. Heating current may be applied in numerous ways known in the art, for example, in accordance with the teachings of U.S. Pat. Nos. 2,389,360, 2,394,051, 3,510,285, 3,628,935, 3,726,658, or preferably 3,847,584 and 4,132,539, all of which teachings are incorporated herein by reference. As taught in the latter two referenced patents, it is preferred that a cyclic heating procedure be used which assures that all of the edges of the unit 10 are heated substantially uniformly to a fusing temperature.

During the preferred cyclic heating procedure, the heated marginal edge portions of upper sheet 12 will attain a temperature at which the glass will become appreciably electrically conductive, afterwhich the electrically conductive stripe burns off.

Heating is continued until the marginal edge portions of upper sheet 12 soften and sag into contact with the margins of the lower sheet 14, and thereafter unite therewith to form a continuous peripheral weld around the unit 10. It had generally been the practice in the art prior to the present invention to begin drawing the sheets 12 and 14 apart during or immediately after a heating cycle. It is believed that such a practice is disadvantageous, in that drawing forces are applied to a fillet-forming body of fused glass which has a narrow, higher temperature region surrounded by cooler regions, thereby producing a fillet 16 with non-uniform and thinner than desirable wall thickness. According to the present invention, the drawing of airspace 18 between sheets 12 and 14 is delayed after the final heating cycle, meaning that the time period is increased between the end of the heating step and the start of the drawing step, to permit the narrow higher temperature region of the fillet-forming body of fused glass to cool and distribute the temperature more evenly to adjoining cooler regions. Thereafter, an airspace 18 may be drawn and fillets 16 having thicker and more uniform wall thicknesses result. The term "final heating cycle" as used herein refers to that heating cycle which immediately precedes the drawing of an airspace 18 between the sheets 12 and 14, and is not intended to preclude the application of heating cycles subsequent to the drawing step. An eyelet 19 (shown only in FIG. 1) is disposed in sheet 14 to permit the ingress of air into the unit 10 during the drawing procedure to generally equalize atmospheric conditions within and without the unit 10.

Generally, the duration of the delay between the final heating cycle and the drawing step should at a minimum, be sufficient to produce a substantially uniform temperature condition in the fillet-forming body of fused glass. In addition, the delay should not substantially extend beyond the time at which the fillet-forming body of glass cools to the glass fusing temperature. Referring to FIG. 2, there is shown a glass-edge multiple glazed unit 10 produced in accordance with the present invention, wherein the airspace 18 is about 3/16 inch (0.46 cm). The fillet 16 adopts a generally inclined orientation in such cases, yielding a generally beveled edge multiple glazed unit 10. In the absence of the present invention, the fillet 16 exhibits acceptable but less than the preferred degree of thickness uniformity. Practice of the present invention, by providing a fillet-forming body of fused glass with substantially uniform temperature, improves the transverse thickness uniformity of the fillet 16.

Figure 3:
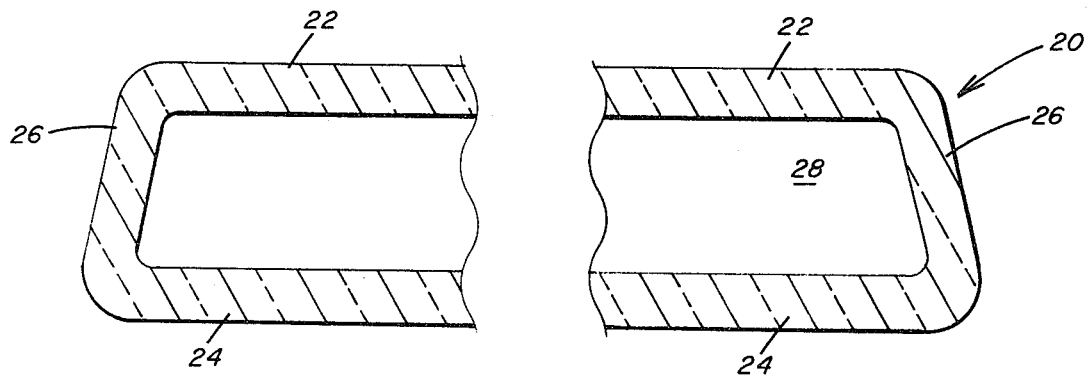
FIG. 3 is a view similar to FIG. 2 illustrating a glass-edge multiple glazed unit produced according to the present invention having increased distance between the sheets.

Referring to FIG. 3, there is shown a unit 20 formed of sheets 22 and 24 joined at their peripheral edges by fillet 26 to form an airspace 28. FIG. 3 illustrates the effect upon fillet 26 which results from drawing the sheets 22 and 24 apart a greater amount, e.g. between about $\frac{1}{4}$ inch (0.63 cm) and about 5/16 inch (0.79 cm.). A comparison of FIGS. 2 and 3 indicates that as the airspace between the sheets is increased, the fillets become more nearly vertical. It has also been determined that, in the absence of the present invention, the fillet 26 will be thinner than fillet 16 and display considerably more non-uniformity in thickness. This phenomena is believed to be caused by the greater amount of draw required to produce fillet 26, thus requiring a greater fillet-forming body of fused glass. According to the present invention, an appropriate delay between the final heating cycle and the drawing step yields a sufficient fillet-forming body of fused glass of substantially uniform temperature to produce a fillet 26 having satisfactory thickness and uniformity characteristics, making the practice of the present invention particularly beneficial where an airspace 28 in excess of 3/16 inch (0.46 cm) is desirable.

In particular, a multiple glazed unit 20 with superior insulating characteristics, i.e., lower winter U-value, can be produced having the increased airspace 28, while structural integrity comparable to prior art units having lesser insulating characteristics is achieved. Winter U-value is defined as the coefficient of heat transmission or thermal transmittance, measured in BTU/hour-squarefoot-°F. U-values may be determined in accordance with the teachings of Chapter 22 of ASHRAE Handbook of Fundamentals, published 1972, which teachings are hereby incorporated by reference. When utilizing sheets 12, 14, 22 and 24 having thicknesses of about 0.09 inch (2.25 mm.), delays between about 3 and 7 seconds, and preferably about 5 seconds were deemed satisfactory.

In an alternate embodiment of the present invention, a stream of cooling fluid, e.g. air, may be directed toward the peripheral edge of the unit 10 after sheets 12 and 14 have fused. Generally, such a technique is utilized to more quickly rigidify the fillet-forming body of fused glass, thus shortening the time period during which the sheets 12 and 14 must be supported in spaced-apart relation after the drawing step is practiced. If the stream of cooling fluid is imparted to the peripheral edge of unit 10 after the final heating cycle but before the drawing step, the duration of delay therebetween should be reduced, preferably to about one second, depending upon the cooling capacity of the stream of cooling fluid utilized. The duration of delay will be unaffected if the stream of cooling fluid is imparted only after the drawing step is practiced.

EXAMPLE

A multiple glazed unit 20 was produced in accordance with the present invention, having sheets 22 and 24 drawn apart a distance of 5/16 inch (0.79 cm.) after a five second delay from the application of the final heating cycle. Sheets 22 and 24 were each 0.09 inch (2.25 mm.) thick. After the unit 20 was cooled to room temperature, the airspace 28 was filled with 95% carbon dioxide gas at a pressure of about 1 atmosphere (760 torr) and the eyelet was soldered to seal the airspace 28.

The winter U-value of the unit 20 was theoretically predicted to be 0.499, comparing favorably with a theoretically predicted winter U-value of 0.558 for a similar unit with a 3/16 inch (0.46 cm.) airspace.

I claim:

1. In a method of fusing edge portions of glass sheets to form a multiple glazed unit, wherein the method includes the steps of positioning at least two sheets having adjacent major surfaces in face-to-face relation; heating the marginal edge portions of at least one of the sheets to form a weld which unites edge portions of the sheets; and drawing the sheets apart to provide a spaced distance between adjacent major surfaces of the sheets, the improvement comprising:
   increasing the time period between the end of the heating step and the start of the drawing step; and
   cooling the welded edge portions of the sheets during said increasing step to produce a substantially uniform temperature condition in a fillet-forming body of fused glass to provide a multiple glazed unit having fillets of substantially uniform thickness about the periphery thereof after the practice of the drawing step.

2. The method as set forth in claim 1 wherein the spaced distance is in excess of 3/16 inch (0.46 cm) between the adjacent major surfaces of the spaced-apart sheets.

3. The method as set forth in claim 1 or 2 wherein the time period during the practice of said increasing step is about one second.

4. The method as set forth in claim 1 or 2 wherein the time period during the practice of said increasing step is about five seconds.

5. The method as set forth in claim 1 or 2 further comprising the step of directing cooling fluid toward the united portions of the sheets after practicing the heating step.

6. The method as set forth in claim 5 wherein said directing step is practiced prior to the drawing step, and wherein the time period during the practice of said increasing step is about one second.

7. The method as set forth in claim 1 or 2 wherein the marginal edge heating step is practiced using electrical currents.

8. The method as set forth in claim 7 wherein the marginal edge heating step comprises the steps of:
   applying a continuous volatilizable electroconductive stripe to the marginal edge portions of at least one of the sheets;
   passing an electrical current through the stripe to heat the marginal edge portions of the at least one sheet to a temperature where the marginal edge portions of the at least one sheet become appreciably electroconductive; and
   passing an electrical current through the electroconductive marginal edge portions of the at least one sheet to heat adjacent portions of the other of the sheets to a temperature above a fusing temperature to unite the marginal edge portions of the at least one sheet and the heated portions of the other sheet.

9. The method as set forth in claim 8 further comprising the step of:
   heating the sheets to an elevated temperature less than the temperature whereat the marginal edge portions become appreciably electroconductive prior to practicing the marginal edge heating step.

10. The method as set forth in claim 9 wherein the positioning step is practiced in a substantially horizontal plane, wherein the marginal edge portions of the upper one of the sheets extends beyond the marginal edge portions of the lower one of the sheets, and wherein the electroconductive stripe is applied to the marginal edge portions of the upper sheet.

* * * * *